United States Patent
Delefevre

(10) Patent No.: US 7,421,096 B2
(45) Date of Patent: Sep. 2, 2008

(54) INPUT MECHANISM FOR FINGERPRINT-BASED INTERNET SEARCH

(76) Inventor: Patrick Y. Delefevre, 190 Ml. Auburn St., Apt. 2-2, Watertown, MA (US) 02472

( * ) Notice: Subject to any disclaimer, the term of this patent is extended or adjusted under 35 U.S.C. 154(b) by 641 days.

(21) Appl. No.: 10/784,420

(22) Filed: Feb. 23, 2004

(65) Prior Publication Data

US 2005/0187909 A1   Aug. 25, 2005

(51) Int. Cl.
*G06K 9/00* (2006.01)
(52) U.S. Cl. .................. 382/116; 382/124; 382/305; 707/3; 707/9
(58) Field of Classification Search .......... 382/100, 382/116, 305, 124; 707/3, 10, 100, 6, 9
See application file for complete search history.

(56) References Cited

U.S. PATENT DOCUMENTS

| | | | | |
|---|---|---|---|---|
| 6,256,623 B1 * | 7/2001 | Jones | ............................. | 707/3 |
| 6,393,417 B1 * | 5/2002 | De Le fevre | .................... | 707/6 |
| 6,519,564 B1 * | 2/2003 | Hoffberg et al. | .......... | 704/270.1 |
| 6,598,051 B1 * | 7/2003 | Wiener et al. | ................ | 707/100 |
| 6,701,317 B1 * | 3/2004 | Wiener et al. | .................. | 707/10 |
| 6,711,558 B1 * | 3/2004 | Indeck et al. | ................... | 707/1 |
| 6,748,375 B1 * | 6/2004 | Wong et al. | ..................... | 707/3 |
| 6,990,453 B2 * | 1/2006 | Wang et al. | .................. | 704/270 |
| 7,007,076 B1 * | 2/2006 | Hess et al. | ................... | 709/219 |
| 7,099,861 B2 * | 8/2006 | Youn | .............................. | 707/3 |
| 7,149,741 B2 * | 12/2006 | Burkey et al. | ................ | 707/100 |
| 7,167,574 B2 * | 1/2007 | Kim | ............................. | 382/100 |
| 2002/0118096 A1 * | 8/2002 | Hoyos et al. | ................ | 340/5.52 |
| 2004/0170306 A1 * | 9/2004 | Miyazaki | ..................... | 382/124 |
| 2005/0108242 A1 * | 5/2005 | Kalker et al. | ................... | 707/10 |
| 2005/0187909 A1 * | 8/2005 | Delefevre | ....................... | 707/3 |
| 2006/0018506 A1 * | 1/2006 | Rodriguez et al. | ........... | 382/100 |
| 2007/0177774 A1 * | 8/2007 | Kuo | ............................ | 382/124 |
| 2007/0271224 A1 * | 11/2007 | Essafi et al. | ..................... | 707/3 |
| 2007/0286465 A1 * | 12/2007 | Takahashi et al. | ............ | 382/125 |

* cited by examiner

*Primary Examiner*—Gregory M Desire
(74) *Attorney, Agent, or Firm*—Robert K. Tendler

(57) ABSTRACT

A targeted search in the form of a fingerprint is generated utilizing audio-visual representations of the search parameters in a master plan so as to present the user with hypothetical vision parameters arrayed in a cascaded manner corresponding to the process individuals use when shopping, with the result being the generation of the parameters that converge on the ultimate fingerprint. In one embodiment a touch screen is utilized to present the hypothetical vision parameters, with the touching of the screen causing a parameter value to be entered into the fingerprint. On-screen vision parameters are kept in the one region of the screen to enable the user to go backwards from any level of the cascade back to any other prior level or even back to the original cascade, such that the cascaded vision parameters are retained on screen. A virtual consultant may be evoked at any point within the cascade to aid the user in making a choice between hypothetical vision parameters, with a zoom feature also being provided to zoom in on a feature in an on-screen vision parameter to be able to further define a parameter within a given category.

16 Claims, 16 Drawing Sheets

Master Plan
Parameters

① Description
② Location
③ Price
④ Customer & Consultant Services
⑤ Payment Agreement
⑥ Shipment & Time
⑦ Insurance/Warrantied
⑧ Maintenance
⑨ Others

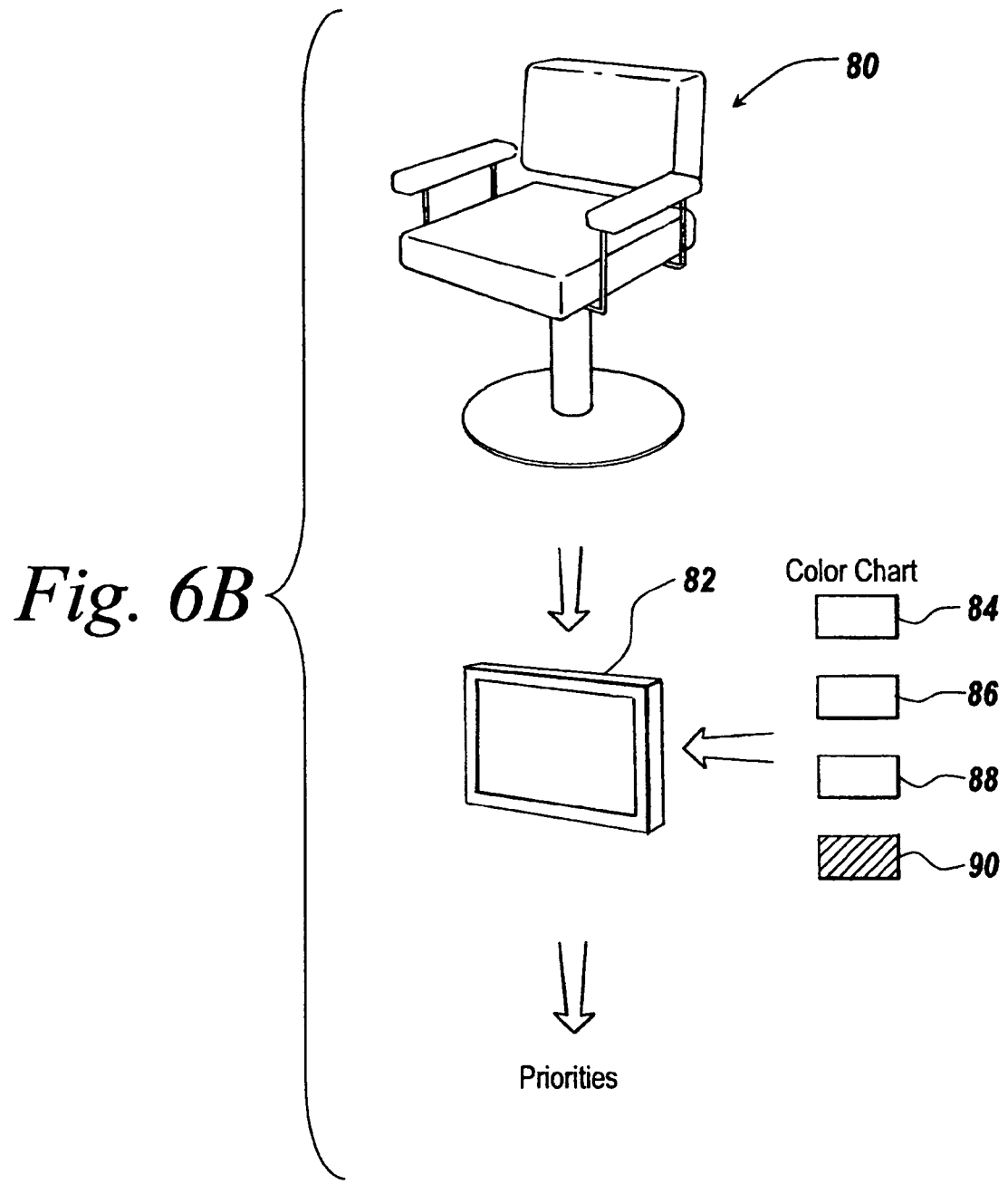

INPUT MECHANISM FOR FINGERPRINT-BASED INTERNET SEARCH

FIELD OF THE INVENTION

This invention relates to internet search methods and more particularly to a non-textual audio/visual input mechanism for specifying fingerprint parameters associated with a master plan.

BACKGROUND OF THE INVENTION

As described in U.S. Pat. No. 6,393,417 issued to Patrick Y. De Le fevre on May 21, 2002 and incorporated herein by reference, a method is described for providing a rapid internet search involving the use of a fingerprint of information associated with a request made by an individual. The fingerprint is forwarded to a library that locates information related to the fingerprint from information submitted as a fingerprint by entrants who enter their data in accordance with a specialized master plan and format.

While the internet search method described in the above-identified patent is exceedingly useful for providing rapid targeted searching, there is a requirement for those either not skilled in the use of computers or even those not able to type in requests to be able to search the internet by navigating through a master plan-defined series of parameters so as to be able to generate appropriate fingerprint requests.

The requirement for an audio-visual presentation scheme for such a targeted internet search method revolves around providing individuals who may not be computer-literate or may not be literate at all with a non-verbal mechanism for getting targeted information. While most internet search methods require the entry of data into fields, this method of searching leaves out a large number of individuals who are either intimidated by the search method or who are unable to utilize it due to a lack of facility in the particular language.

For instance, in underdeveloped countries there may be no ability at all to utilize current text-based internet search methods such as the case presently with the Middle Eastern countries in which less than 2% of the households are capable of searching the internet and in which Arabic does not use a 26-character alphabet. Note, Arabic language difficulties may provide a problem in terms of input devices for a system that was generally conceived for English and the Romance Languages using alpha-numeric characters. Also important are other individuals whose natural language does not have such an alphabet, such as Chinese and Japanese where the written form of the language includes a large number of characters, often exceeding 3,000.

Thus in order for the maximum number of individuals to be able to utilize an internet search method and to be able to converge on an item or items they desire, one needs to be able to provide a system which is independent of the particular written language of the individual. The result of opening up the internet to a non-textual universe of users is indeed quite important to the universal utilization of the internet. Moreover, since key word searching and the like are used in textual-based searches to obtain information, it is therefore thought necessary to provide a non-textual basis for targeted searching so that even if the individual is not familiar with either computer language or the particular textual language involved, the individual many nonetheless provide himself or herself with specific desired information.

SUMMARY OF INVENTION

Rather than relying on a textual internet search system in which alpha-numeric characters are entered into a field that is presented on-screen, in the subject system a so-called fingerprint of information is generated by presenting the individual with on-screen vision parameters, with the parameters being pictured in terms of hypothetical elements indicative of the particular parameter.

For instance, if an individual is starting a search for a particular item, the individual is presented with a world view in which a rotating map of the world is presented. In a cascading fashion, the user then clicks on the particular region of the world that he wishes to have information about or at which he wishes to buy a particular item. Through a series of on-screen zoom features the individual can zoom in on a particular geographic area, at which point the individual may be provided with a vision parameter in terms of, for instance, a view of a particular city. The user may then zoom in on, for instance, a particular building, school, house or other related vision parameter, for instance, an office in an office building. If the individual is interested in, for instance, buying a chair for a desk, the individual can zoom in even further to hypothetical visual representations on the screen of an office room and then onto a particular chair in the room.

Hypothetical vision parameters are then presented in a cascading fashion to the individual to indicate, for instance, the style of chair, the materials for the back and seat of the chair, the type of arm that the individual is seeking, all choices being visually presented to the individual in a natural cascading fashion so as to home in on the desired parameter.

During any of the user's choices the user may invoke a consultant to assist him in the choice, which may be pre-recorded audio-visual advice to assist the person in selecting the appropriate vision parameter. Also, provision is made for multiple consultants, again indicated on-screen or audibly so that the individual does not have to type in any characters into a field.

As a feature of the subject invention, the various levels of categories are presented on-screen at all times in terms of vision parameters. This enables the individual, cascading down through a series of choices, to be able to backtrack and go back to other choices by merely clicking on a prior vision parameter which is presented. As a result, one does not have to lose one's order in order to backtrack through the various choices that the individual has made, with the individual being able to access any given level in the cascading process. The result is that an individual, for instance, having decided that he does not know what type of arm he wants, can go back and change the type of chair by clicking on a prior vision parameter so that one, for instance, could go from a Queen Anne chair to, for instance, a contemporary chair by merely clicking back onto the vision parameter presented priorly and maintained on-screen, in one embodiment to the right of the screen.

All of the vision parameters are keyed to the aforementioned master plan described in U.S. Pat. No. 6,393,417. The master plan dictates categories and subcategories and is initially generated through information provided by Entrants into the particular Library at which a fingerprint is matched to a fingerprint from an Entrant. Thus the vision parameters in one embodiment are generated by information supplied by each of the Entrants when the Entrants sign up and provide the information in accordance with the basic master plan.

It will be appreciated that all vision parameters present hypothetical situations which are presented to each of the users so that the user can generate his own set of parameters which are automatically incorporated into his search fingerprint. Likewise, information from the Entrants can be generated in a non-textual context by entering information into the Library which is accessed by the users, and to this end the Entrant may be provided with his own touch-screen input mechanism to enter data of his particular fingerprint.

The touch screen audio-visual non-textual system automatically generates fingerprints, be they User fingerprints or Entrant fingerprints, with the touch-screen device either being integral to the user's computer or more likely an auxiliary device which is either hard-wired to the computer or which utilizes an RF or IR interface to the computer. RF and IF signaling are commonplace as indicated, for instance, by the 802.11b protocol as well as several infrared protocols.

What is provided, therefore, is a user-friendly, non-textual input mechanism for a fingerprint-based internet search method. While the subject invention will be described in terms of non-textual input, textual input in combination with the non-textual input is considered to be part of the subject invention.

In summary, a targeted search in the form of a fingerprint is generated utilizing audio-visual representations of the search parameters in a master plan so as to present the user with hypothetical vision parameters arrayed in a cascaded manner corresponding to the process individuals use when shopping, with the result being the generation of the parameters that converge on the ultimate fingerprint. In one embodiment a touch screen is utilized to present the hypothetical vision parameters, with the touching of the screen causing a parameter value to be entered into the fingerprint. On-screen vision parameters are kept in the one region of the screen to enable the user to go backwards from any level of the cascade back to any other prior level or even back to the original cascade, such that the cascaded vision parameters are retained on screen. A virtual consultant may be evoked at any point within the cascade to aid the user in making a choice between hypothetical vision parameters, with a zoom feature also being provided to zoom in on a feature in an on-screen vision parameter to be able to further define a parameter within a given category.

BRIEF DESCRIPTION OF THE DRAWINGS

These and other features of the subject invention will be better understood in connection with a Detailed Description, in conjunction with the Drawings, of which:

FIGS. 6A and 6B are diagrammatic flowcharts for hypothetical vision parameters cascaded to go from a world view down to the selection of a chair back and its color;

DETAILED DESCRIPTION

Figures 1, 2:
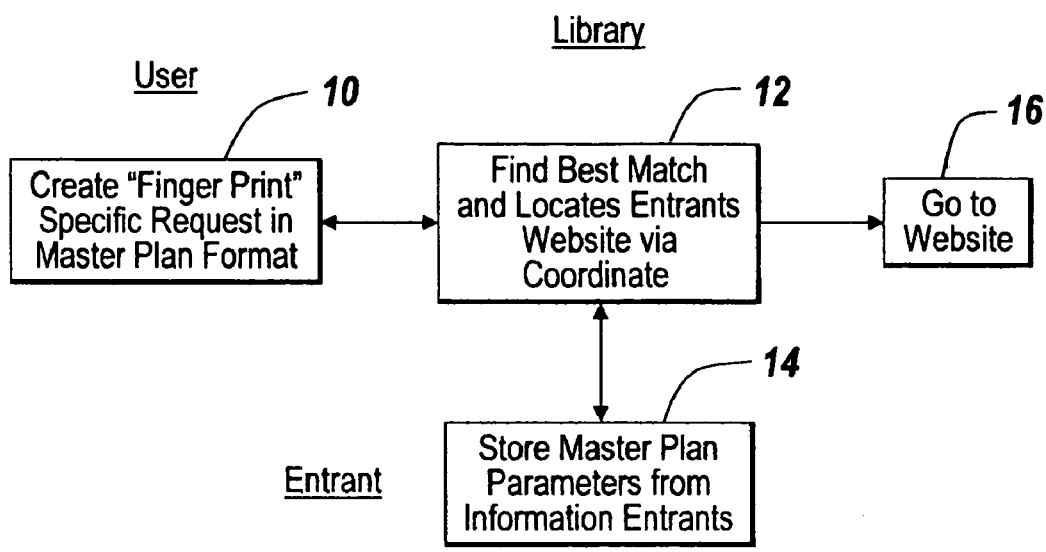
FIG. 1 is a block diagram of an internet search method showing the generation of a fingerprint which is transmitted to a library having information from a number of information entrants stored therein.
FIG. 2 is a table of master plan parameters.

Referring now to FIG. 1, a fingerprint-based internet search method includes a step, as illustrated at 10, of creating a fingerprint for the requester. This fingerprint is a specific request for information and has within it specific information about the requesting party in terms of a master plan format. In one embodiment, a fingerprint is a series of numerals, numbers or codes which are transmitted to a library 12 which has pre-stored therein parameters from a large number of information entrants indicated at 14. These parameters are master plan parameters and include description, location, price, customer feedback, payment, shipment and time, insurance/warrant, and maintenance parameters. It will be appreciated that other parameters may be useful for the master plan but it is important that the entrants provide, in addition to their parameters, their website address so that, upon a query, library 12 is searched and matches are provided between the fingerprint from a requester and the fingerprint or fingerprints from the entrants.

Thereafter, upon obtaining one or more matches, the method includes the step of locating the entrant and its websites by virtue of the coordinates associated with the fingerprint. The result is the entrant's website transmitted back to the requester.

It is important that the information entrants and the requesters have a common set of parameters, in this case referred to as a master plan. This is illustrated in FIG. 2, in which eight parameters are specified. In one embodiment, the parameters are as indicated above, namely the description, location, price, customer feedback, payment, shipment and time, insurance/warranty, and maintenance. Other parameters may be useful as well. The only requirement for the parameters is that they be used in creation of the fingerprint and used in the information entered from the entrants into the library.

It is possible, though means to be described, that a master cone can be generated which is a combination of all of the different parameters, with each of the subcones that are possible relating to information concerning a given parameter. The master cone thus includes all of the master plan parameters, with convergence towards a fingerprint resulting from various choices that are made at each level of the convergence.

Figure 3:
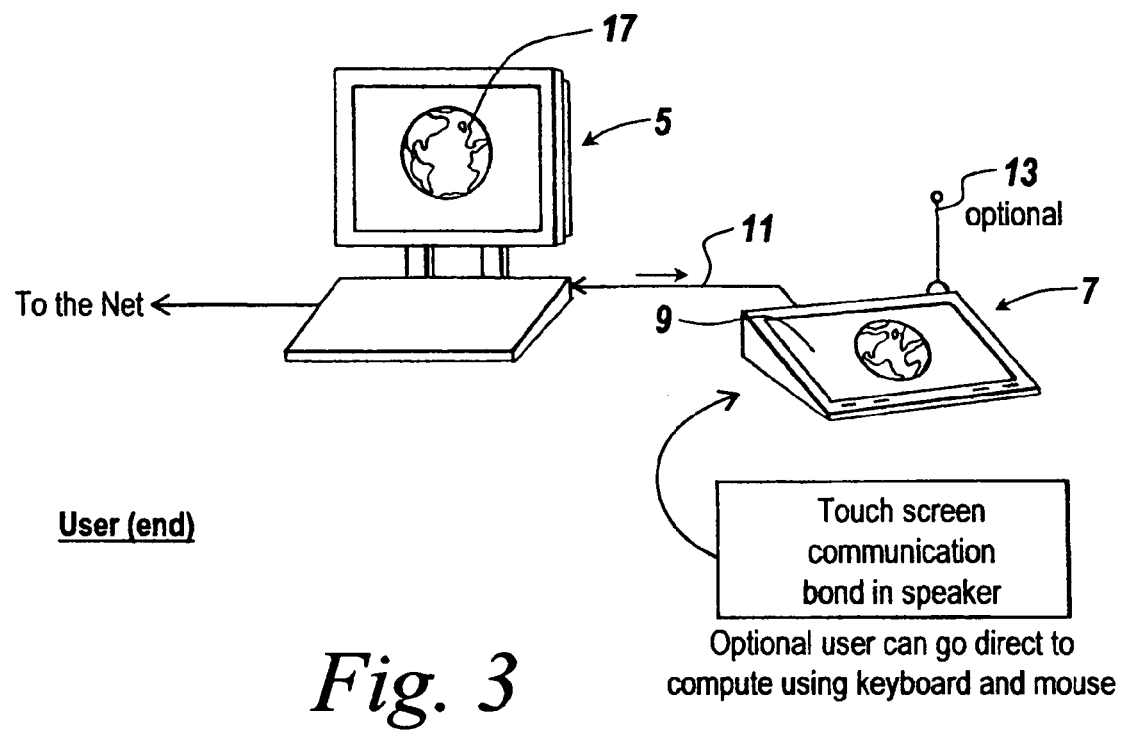
FIG. 3 is a diagrammatic illustration of the input mechanism for a user into a fingerprint-based search method.

How the information is entered is shown in FIG. 3 from the user's point of view in which a computer 5 is provided with a tablet 7 which may include a touch-screen display 9, with the tablet being either hard-wired to the computer via a hard-wire 11, or optionally being coupled through an RF link as illustrated by antenna 13. It is noted that computer 5 is coupled to the internet as illustrated at 15.

Figure 4:
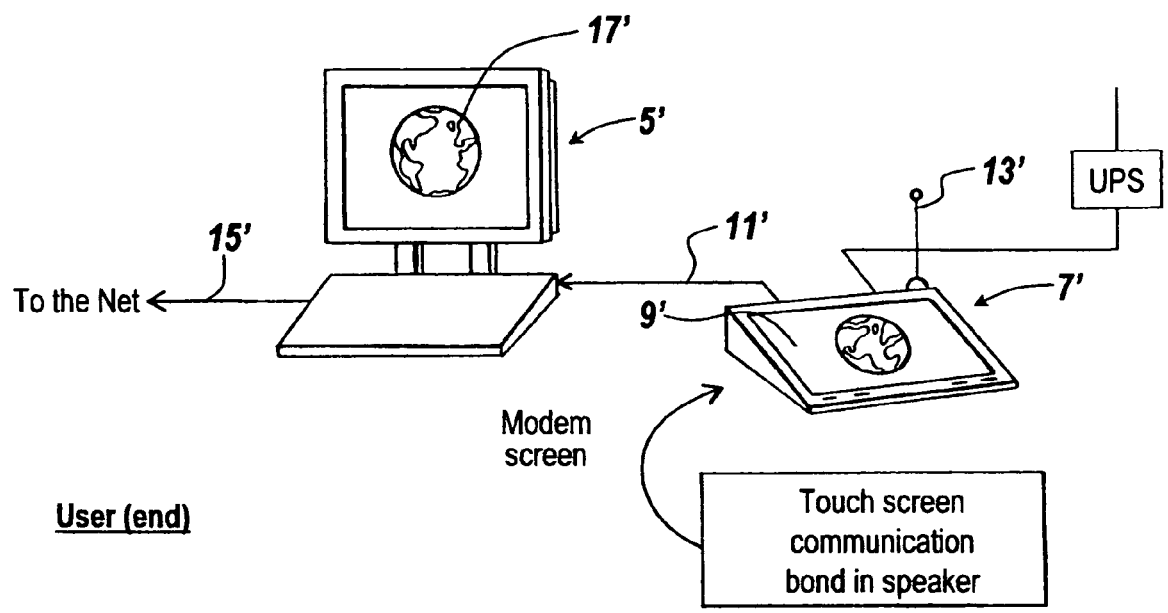
FIG. 4 is a diagrammatic illustration of the entrant input mechanism for the fingerprint-based internet search method of FIG. 3.
Figure 5:
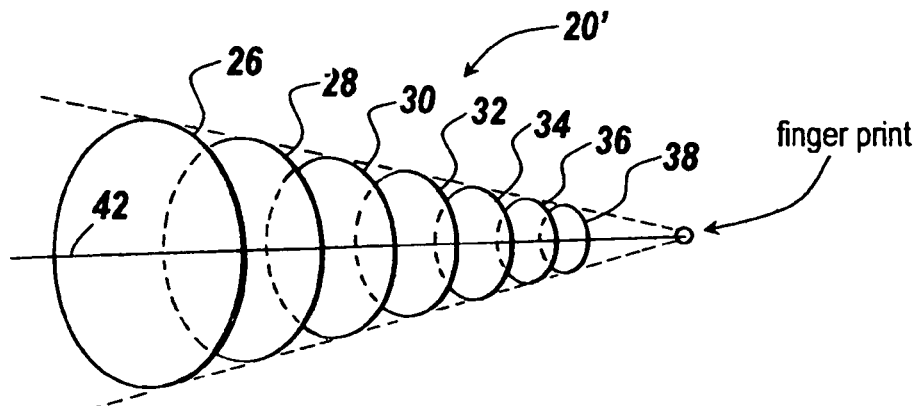
FIG. 5 is a diagrammatic representation of an individual subcone within a master cone.

Likewise, referring to FIG. 4, the entrants are provided with a computer 5' having a tablet 7' connected to computer 5' by hard wire 11', with this tablet also being provided with an optional RF link, the antenna 13' of which is shown as illustrated. In this case, tablet 7' is provided with a touch screen display 9'. It will be appreciated that the entrants provide their information through tablet 7 so that the same inputting system can be used to generate fingerprints.

While the subject invention will be described in terms of a separate touch screen display tablet, it is possible to provide each of the computers either at the user's end or the entrant's end with touch-screen displays.

As will be seen, various vision parameters 17 and 17' are displayed both on the computer monitors and likewise on the respective tablets as illustrated.

It is through this input modality that a textless fingerprint entry system is provided so that rapid matching and delivery of results to a user may be accomplished without the requirement of the user having to enter alpha-numerics into a particular field on a computer screen.

As mentioned before, a master cone which houses layers or levels of parameters, may include a particular subcone here as illustrated at 20' having a number of cross-sectional planes 26, 28, 30, 32, 34, 36 and 38. Decisions on each of these planes further defines the information which is selected to be included in the fingerprint. It will be appreciated that, that which is contained at a given cross-sectional plane is information related to that particular parameter.

Assuming, for instance, that subcone 20' represents the location parameter, plane 26 relates to an address information, then branches within that plane towards a central axis 42 to define, for instance, acceptable locations of the unit requested in the query. For instance, if the requester is seeking shoes, he may decide that the only source of the shoe he is interested in is to be located in the northeastern states. This particular parameter is specified at plane 26 by virtue of providing a numbering system that is described in the aforementioned patent.

In addition to specifying that the shoe is required to be available in the northeastern states, the individual may want to specify an address for the main office, addresses for technical support, an address for payment for the shoes, where the shoes are to be returned, and all types of address-based information. In addition, as a branching operation for each of these elements, for instance, the main office, one may wish to specify the continent, country, state, city, street, building, floor, apartment, zip code, post office box, telephone number, email address, or other information.

This information is added to the fingerprint by specifying it at this first plane. It will be appreciated that if the requester does not want to provide this information, it need not be provided. The important point is that the master plan permits this level of information to be added to the fingerprint at the time of requesting of information.

By way of an example, plane 28 may specify a limit on the amount of distance that the shoe is to travel between the shipping point and the recipient point. Furthermore, this plane may specify by what mode the shipment is to be made, e.g., either by air, truck, train or by ship.

One further position plane such as plane 30 may specify the routing of the unit from the shipping site to the requester site. Moreover, it may be important to the requester that the shoe be available for viewing at a particular location. Additionally, this plane may be one requiring the output of instructions to the requester as to how to get to a viewing site, for instance, at a shopping mall.

A further plane such as illustrated at 32 may be utilized to specify the types of transportation available for the requester to go to the viewing site. At this plane, the requester can specify whether this transportation is to be either paid or courtesy.

At plane 34, a further type of requester-specified information may be, for instance, are samples available and if so, are they free or for a charge. The requester may also specify whether he requires a professional sample or a production sample. Moreover, the requester can specify whether the sample may be kept for an indefinite period of time or what the return policy is on the sample.

Position plane 36 may, for instance, be used for indicating whether any special permits are required to view the item or to purchase the item. Moreover, any other prerequisites for the viewing and purchasing of the item may be specified at this plane. Finally, plane 38 may be utilized for any other information that is location-sensitive.

What will be appreciated is that the above has described the fingerprint search method of the above-mentioned patent. What will be appreciated is that what is necessary is to be able to enter this type of information, not with a text-based system, but rather with a system that utilizes hypothetical vision parameters which are displayed to the individual making the query.

Figure 6A:
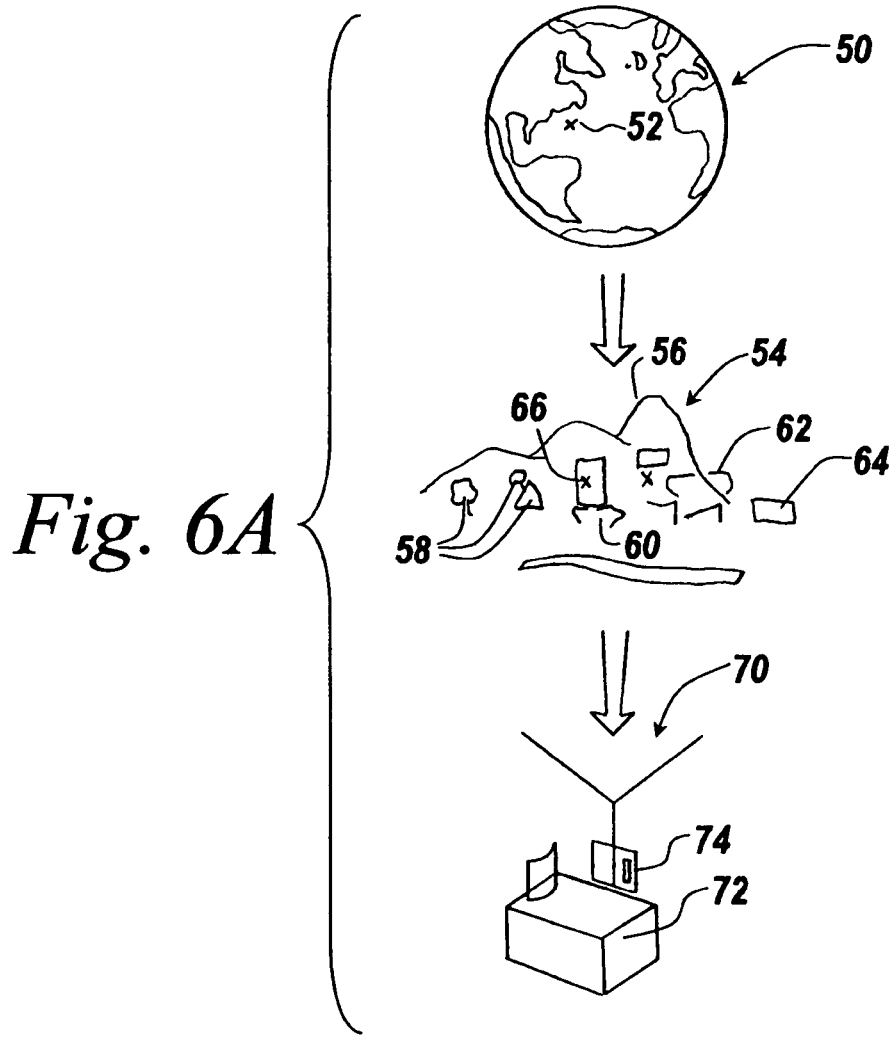

Referring to FIG. 6A, for instance, starting with a rotating globe 50, one may want to click on the globe to indicate a position parameter such as, for instance, a particular city in a particular country. Having clicked on a position 52 one can then be directed in a cascade to a picture, for instance, of the city which exists at position 52. This city is illustrated at 54 and may comprise a number of features, including mountains 56, houses 58, an office building 60, a community center 62, and a garage 64. Assuming that one is interested in furnishing a room in office building 60, cascading from this element by clicking on 66 can result in the portrayal of a hypothetical room 70 having a desk 72 and a chair 74.

Assuming the individual wants to furnish his office and more particularly, assuming that the individual wants to select a chair for his office, then via hypothetical vision parameters illustrated at 80, a chair may be presented. This particular type of chair may be one selected from a number of slides to be described hereinafter. However, if one is interested in selecting the back of the chair as illustrated at 82, and more particularly the color of the back of the chair as illustrated at 82, 86, 88 or 90, then one in the subject hypothetical vision parameter selection process may select, for instance, a green backing for his chair. Once having selected the chair, the backing and the color, one can be directed towards a priorities level to indicate whatever priority should be attached to this particular item.

What will be appreciated in this cascaded visual layering context is that choices can be given to an individual by presenting him with slides or pictographs of a hypothetical object and have the individual further define the object. In doing each of his or her selections, a number for the fingerprint is developed such that when all of the selections are made, in this case by a non-textual route, the fingerprint described in this inputting system is one which is easily obtained by an individual having little or no computer training or specific knowledge of a language.

Figure 7:
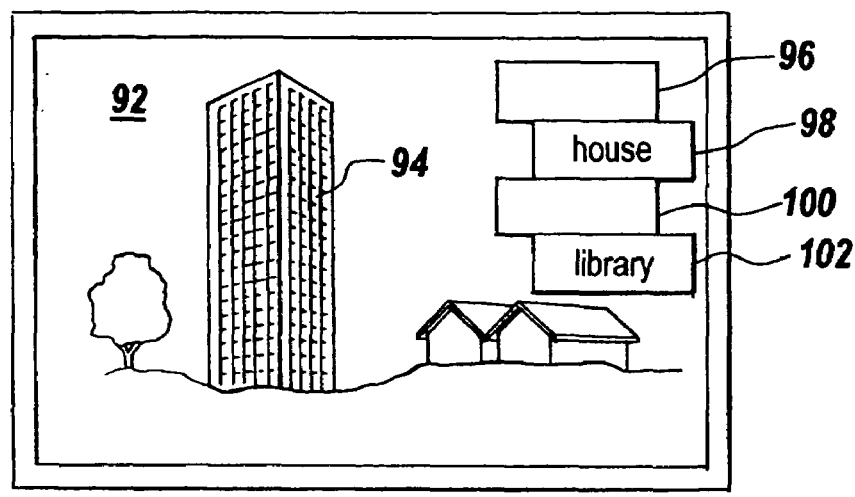
FIG. 7 is a diagrammatic illustration of a screen shot showing a number of vision parameters maintained on-screen to permit going backwards to any level of a cascade.

Referring to FIG. 7, what is seen is a screen 92 which has an office building 94 pictured thereon, having been a building that has been pre-selected through a prior parameter selection process. However, as can be seen to the right of the screen, a number of different edifices such as a hospital 96, a home 98, a school 100 or a library 102, are presented so that if the individual wishes to select a different edifice other than an office building, all of the prior edifices are stored and displayed at a portion of the computer screen. What this means is that prior categories of items, one of which has been previously selected, may be displayed to the user so that the user can go back in the cascaded ordered context in order to change his or her mind without losing his or her place.

Figure 8:
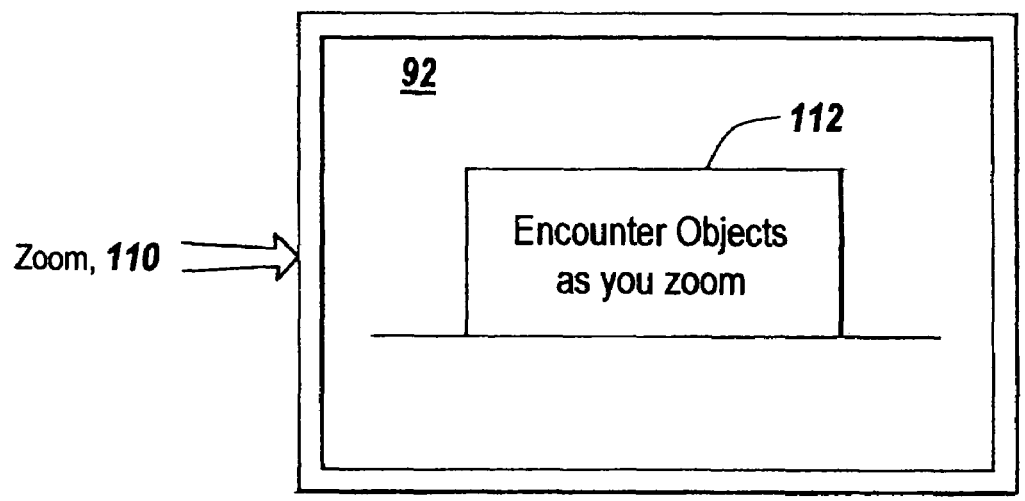
FIG. 8 is a diagrammatic illustration of a screen shot showing a zoom feature to facilitate encountering new objects as one zooms.

Referring now to FIG. 8, computer screen 92 may be provided with a zoom function 110 so that as one encounters items in the hypothetical space, as illustrated at 112, one can, as one zooms in on a particular area, encounter new, previously unseen objects.

One way to understand this is to understand that if one is flying above a terrain, one first may see clouds which obscure the ground. As one zooms into the clouds, one may be presented with ground artifacts such as buildings. If one is presented with a building, then one can zoom through the building to, for instance, the aforementioned chair in an office.

The ability to zoom not only to magnify what one is looking at but also to encounter objects which are subsets of the object displayed permits a rapid convergence on what the user wishes to add to his or her fingerprint.

Figure 9:
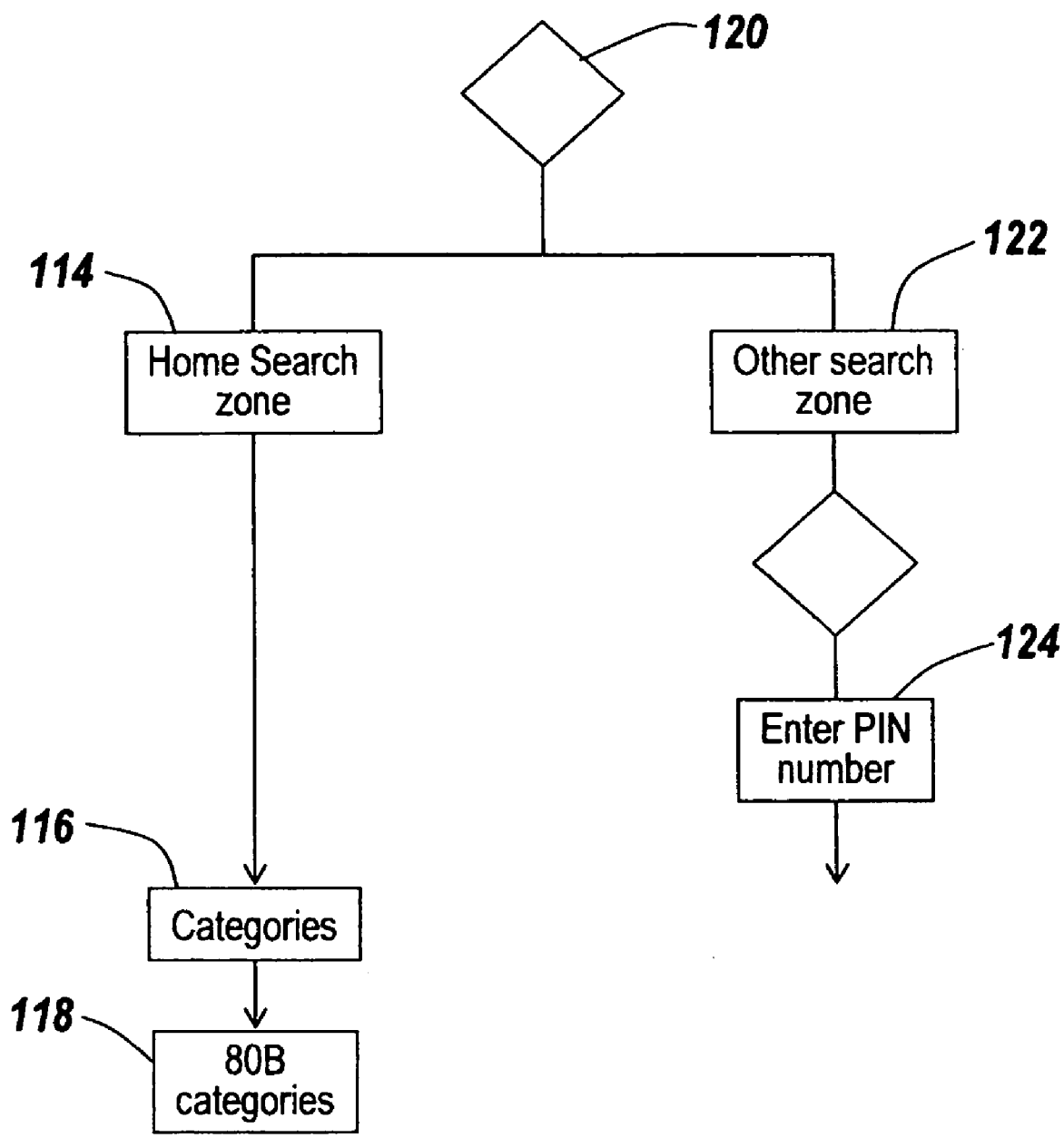
FIG. 9 is a flow chart illustrating the ability to have a home search zone or another search zone in which the home search zone permits access to various categories and subcategories, whereas the other search zone permits access only through the entering of a PIN number.

As illustrated in FIG. 9, assuming an individual wants to search a home search zone 114, he may do so, which may lead him to certain categories 116 and certain subcategories 118. Alternatively, at the selection step 120, the user may want to search another search zone 122 and may further be allowed access to the categories within their search zone only through the entry of a PIN number as illustrated at 124.

Figure 10:
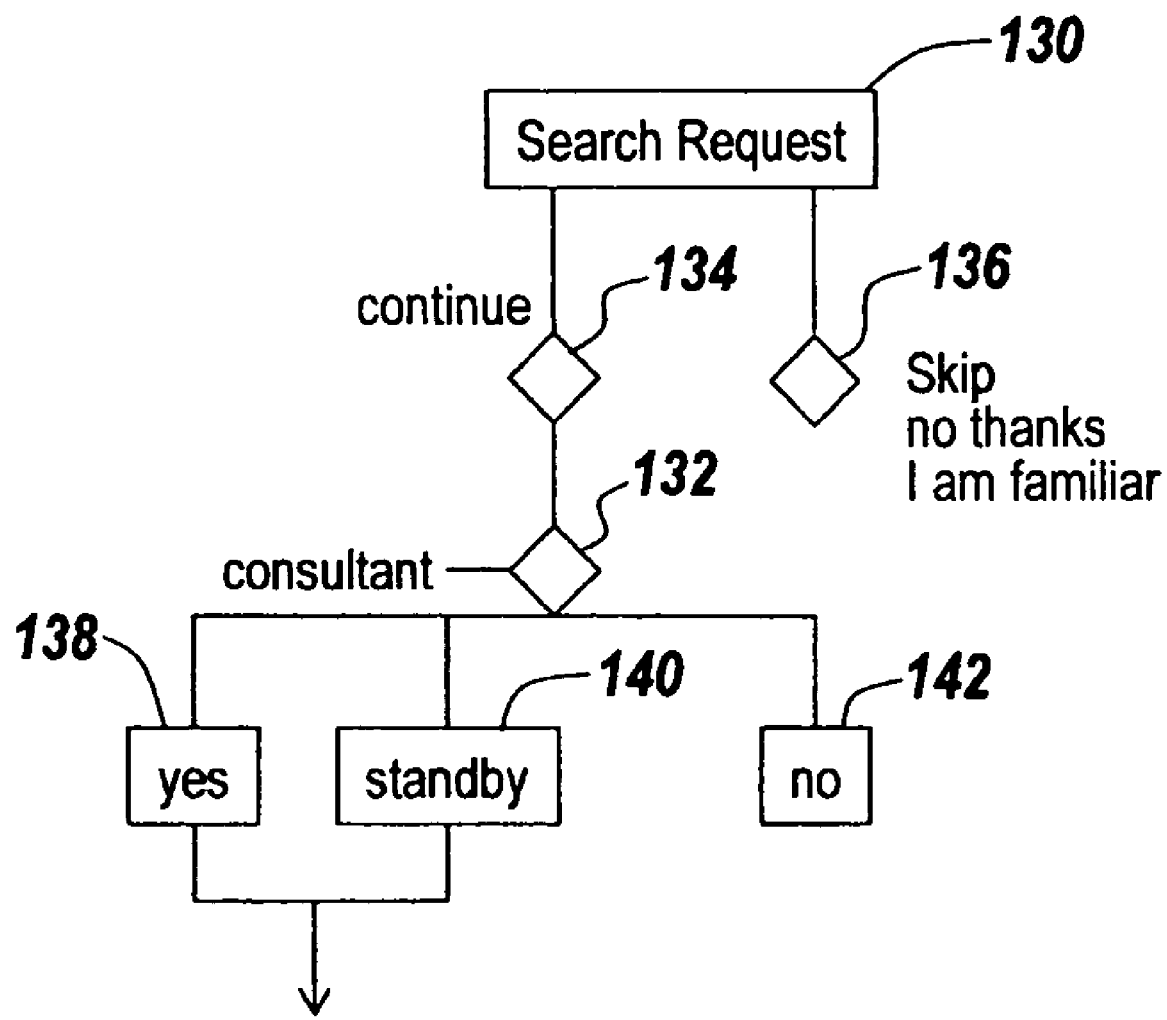
FIG. 10 is a flowchart showing the ability to access a consultant or to be able to skip a consulting step.

As mentioned hereinbefore and referring to FIG. 10, a search request 130 may require the assistance of a consultant 132 along with a decision block 134, which is under the control of the user, to continue to query a consultant. At 136 the user may make a decision to skip the consulting process altogether, whereas if a consultant is required by the user, the decision block 132 can indicate "yes" as illustrated at 138, that a particular consultant should be queried or, as illustrated at 140, the consultant is placed on standby. As illustrated 142, the user, once having decided that he wants a consultant, may indicate that he no longer wants one.

Figure 11:
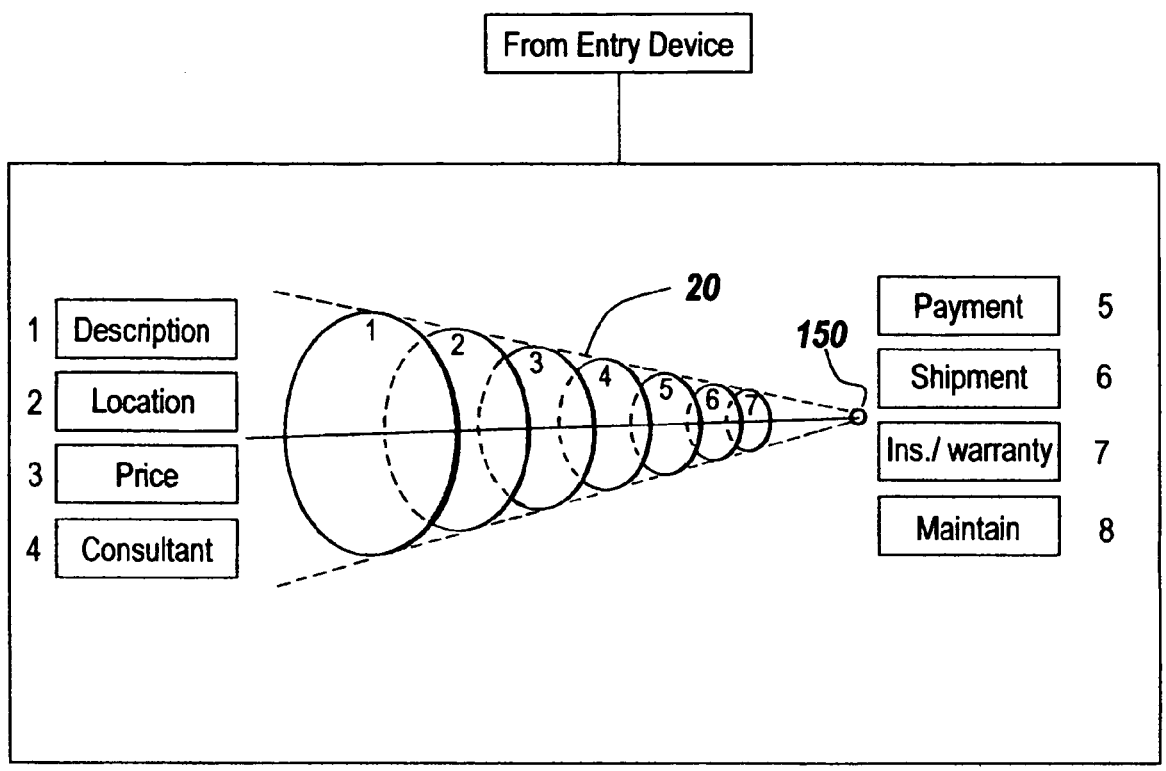
FIG. 11 is a diagrammatic illustration of a cone of several classes of parameters, including description, location, price, consultant, payment, shipment, insurance/warranty and maintenance, showing an order of priority from description down to maintenance.

Referring now to FIG. 11, cone 20 is shown as having a number of levels or planes 1-8. These correspond to, in descending order, description, location, price, consultant, payment, shipping, insurance/warranty or maintenance. When passing through these filters the fingerprint which exits at 150 takes into account all of these parameters.

Figure 12:
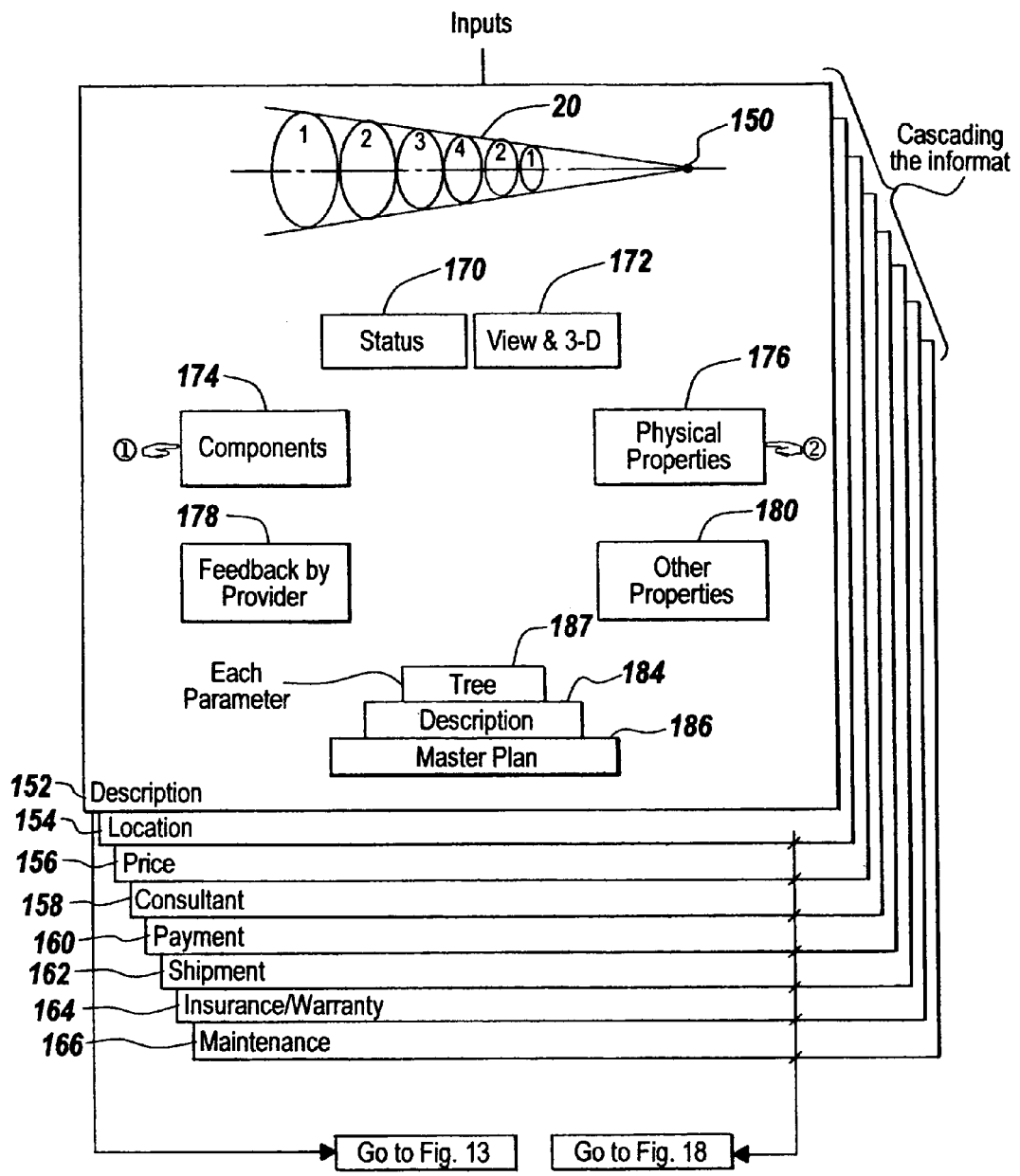
FIG. 12 is a diagrammatic illustration of the cascading of parameters in terms of pages, including description, location, price, consultant, payment, shipment, insurance/warranty and maintenance, related to the cascaded levels of the cone of FIG. 11.

Referring now to FIG. 12, for instance, for the description level, level 1 of cone 20, each of the levels has its own page here illustrated at 152, 154, 156, 158, 160, 162, 164 and 166. Each of these levels may be viewed as to its status 170, 3D views as illustrated 172, components as illustrated 174, physical properties as illustrated 176, feedback from a provider 178 and other properties 180. All of this information can be presented to the user utilizing the hypothetical visual parameters or it may be presented in some type of textual graphic.

All of this can be presented in an information tree atop a description atop the master plan as illustrated at 182, 184 and 186.

Thus, the user may be able to view his or her selections with all of the relevant information, with the sum of all of the pages presented contributing to the aforementioned fingerprint 150.

Figure 13:
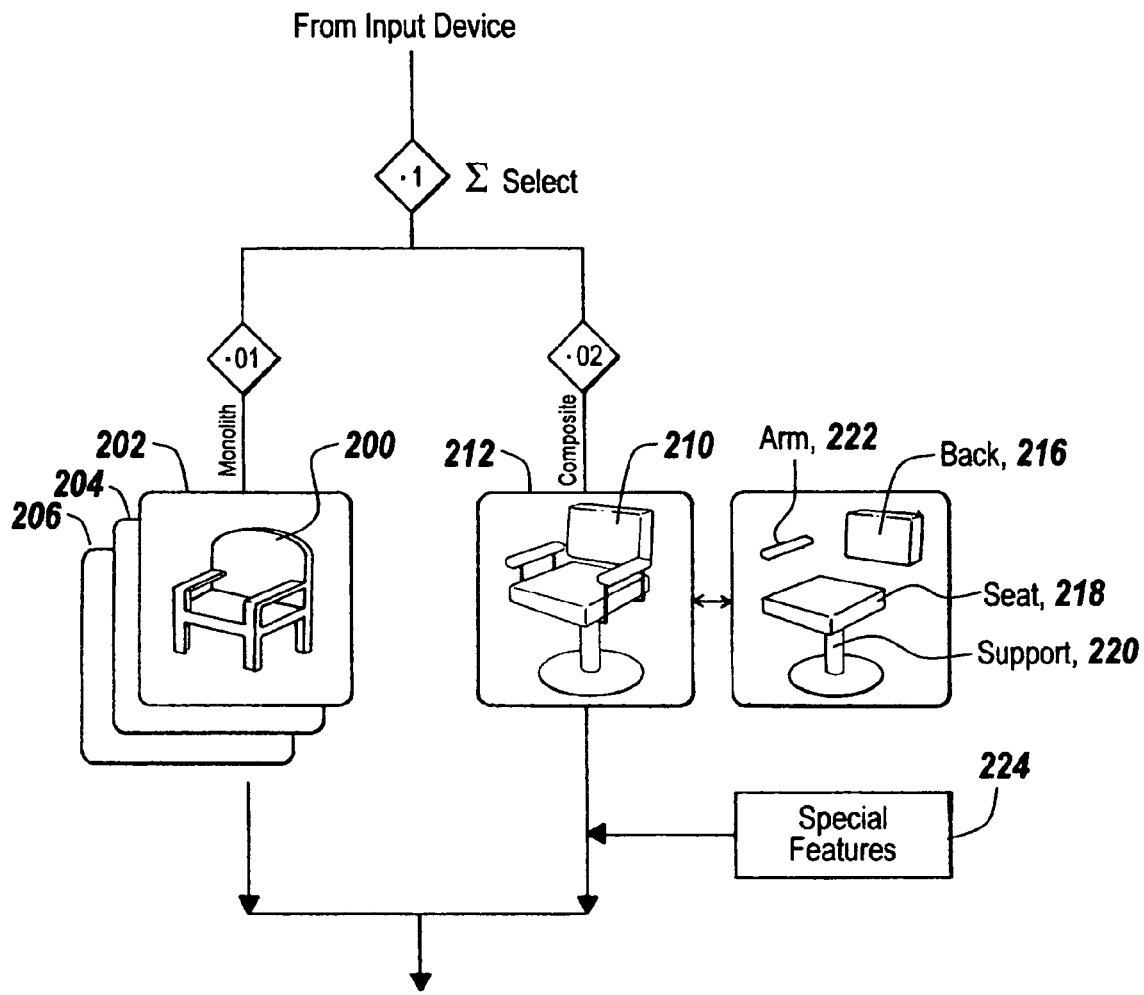
FIG. 13 is a flowchart illustrating for the selection of a monolithic chair or a composite chair, illustrating in separate slides the composite chair, a support, a seat, an arm, and a back, also indicating the ability to enter special features.

In one example how this is accomplished and presented is shown in FIG. 13. From an input device, for instance, for chairs, a user may select either monolith-type chairs as illustrated at 200, which category includes a number of slides 202, 204 and 206. The user may also select a composite chair such as is illustrated at 210, which chair is depicted in a slide 212 or may be disassembled in a slide 214 presented to the user. Here the disassembled chair is disassembled into its various components, namely a back 216, a seat 218, a support 220 and an arm 222. Special features 222 may be added so that when the user clicks on a particular slide, the slide may be modified by adding special features that are custom-made.

Figure 14:
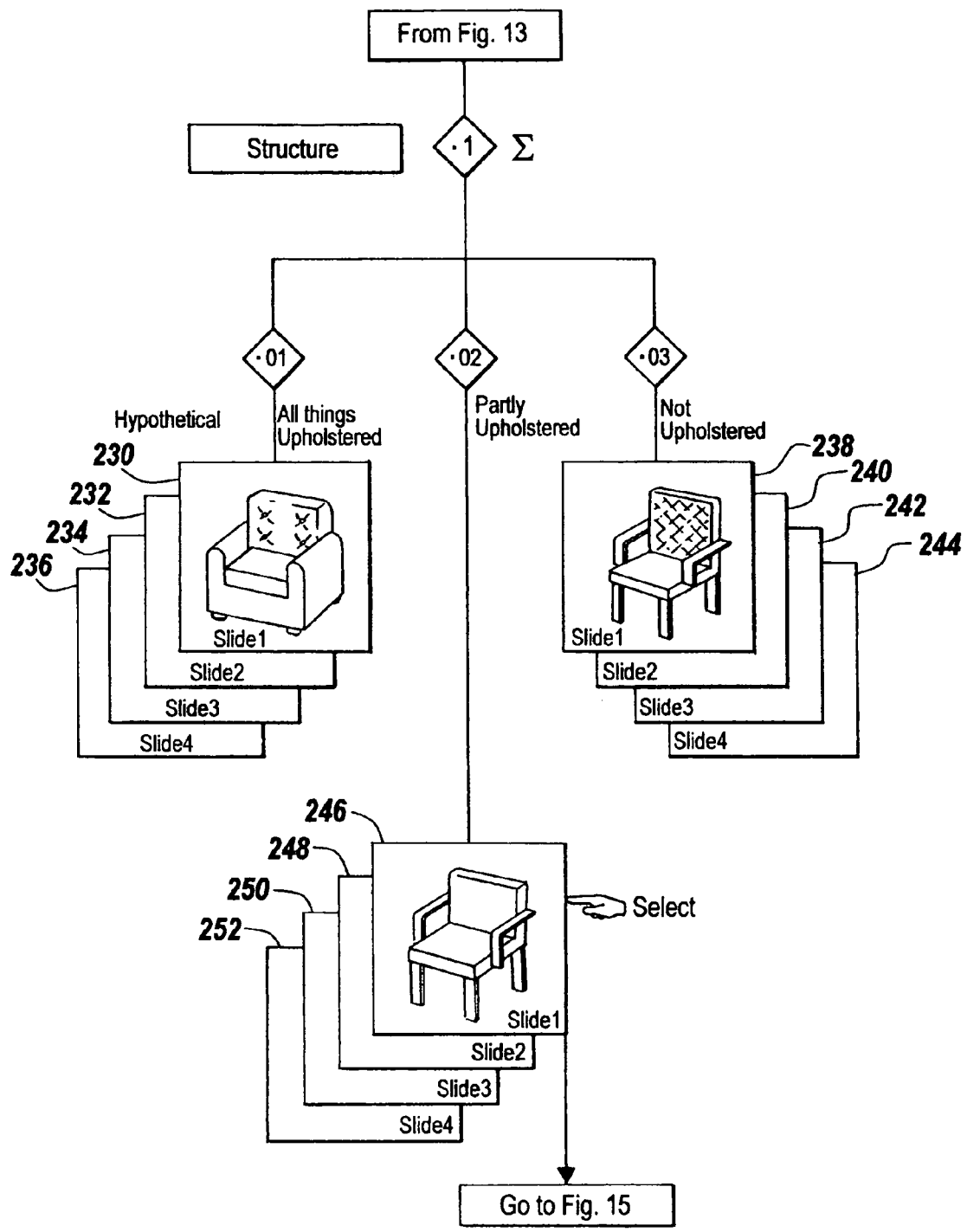
FIG. 14 is a flowchart illustrating that a fingerprint is made up of the sum of the choices made through the viewing of hypothetical slides, with, in one example, each slide having a different upholstered look, non-upholstered look or partially-upholstered look.

In the selection of a chair, and referring now to FIG. 14, if one wants that the chair be completely upholstered, then slides 230, 232, 234 and 236 are presented for hypothetical upholstered chairs. If the individual decides to select unupholstered chairs, he may be directed towards slides 238, 240, 242 or 244. For partly upholstered chairs, he may be directed to slides 246, 248, 250 and 252.

Through this mechanism of presenting hypothetical choices to the user in a visual and/or audible format, the user can be led down through a cascade of choices so as to derive a fingerprint for his ultimate choice.

Figure 15:
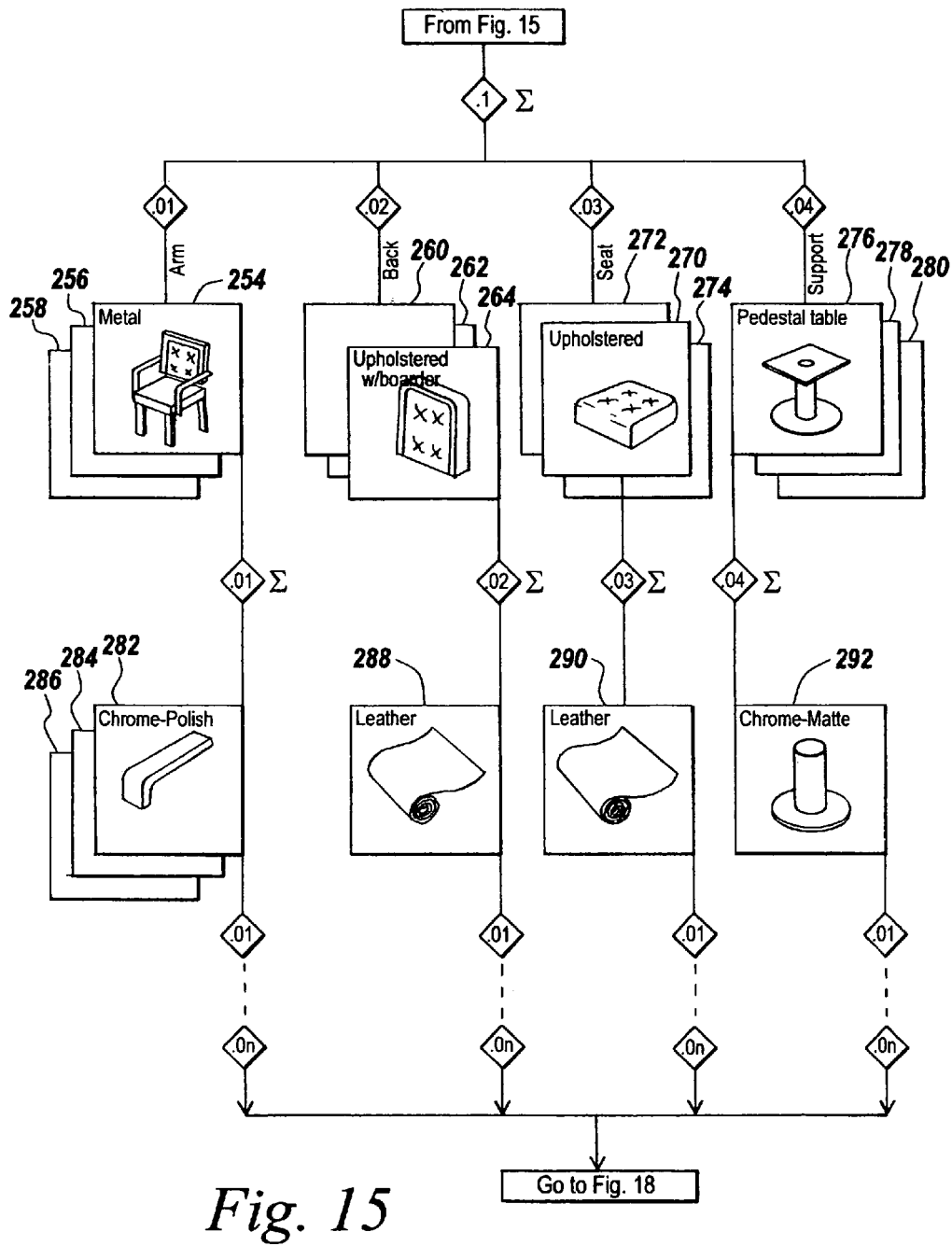
FIG. 15 is a flow chart showing a chair, and selection from a number of separate items: arms, backs, seats, and supports for a chair, based on the selection of a number of slides corresponding to hypothetical vision parameters, also illustrating the type of finish for the arm, namely chrome; the back of the chair, namely leather; the seat of the chair, namely leather; and the pedestal for the chair, namely a matt chrome finish.

For even further refining of the particular query, and referring now to FIG. 15, assuming for instance that one has chosen a partly-upholstered chair, then one could specify, for instance, in terms of slides 254, 256 and 258 various different-style arms for the chair. Likewise, through slides 260, 262 and 264, one can specify upholstered backs with borders as opposed to backs of any of a variety of different configurations, as indicated by the slides.

Likewise, one could specify the seat as being upholstered as illustrated at slide 270 or in any other configuration 272 of 274, whereas for a support, one may be looking at a metal pedestal support 276 amongst other slides 278 and 280. Given, for instance, that one wants a metal arm for one's chair, one can select from a number of finishes, namely that shown at slide 282 to be chrome-polished finished, whereas other finishes could be depicted in slides 284 and 286. For upholstered chairs with borders, one may want to select the type of material and here a slide 288 indicates leather. For an upholstered seat, likewise slide 290 indicates that leather is preferred, whereas for a metal pedestal, the finish is a chrome matte finish as illustrated by slide 292.

Figure 16:
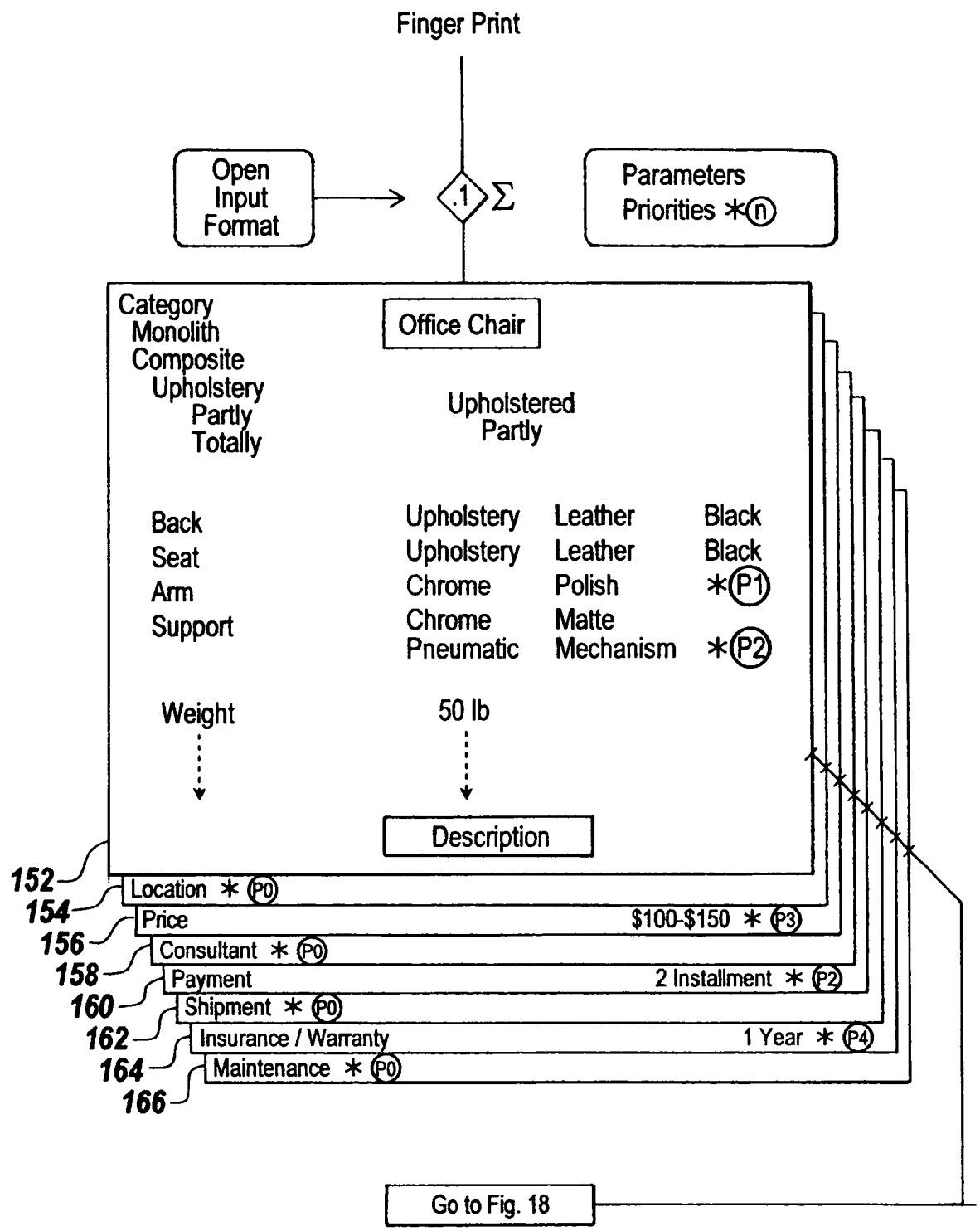
FIG. 16 is a diagrammatic illustration of the ability for descriptions, locations, price, consultant, payment, shipment, insurance/warranty and maintenance, that certain parameters may be entered in via typing of alphanumeric characters when such is desired.

While all of the above entries for the fingerprint are done on a hypothetical visual parameter basis, referring to FIG. 16, in the subject invention it is also possible to type in alpha-numerics to describe the parameters. Here it can be seen that various levels in the cone can be filled in alpha-numerically such that for location, consultants, shipment, and maintenance, there are no entries whereas for price a range of $100-150 this is typed in, whereas payments are indicated as requiring two installments; and whereas the warranty is to be a one-year warranty.

The purpose of showing the configuration of FIG. 16 is to indicate that while it is desirable to have a system in which one presents parameters visually and/or orally as opposed to in alpha-numeric form, the system is not limited thereto.

Figure 17:
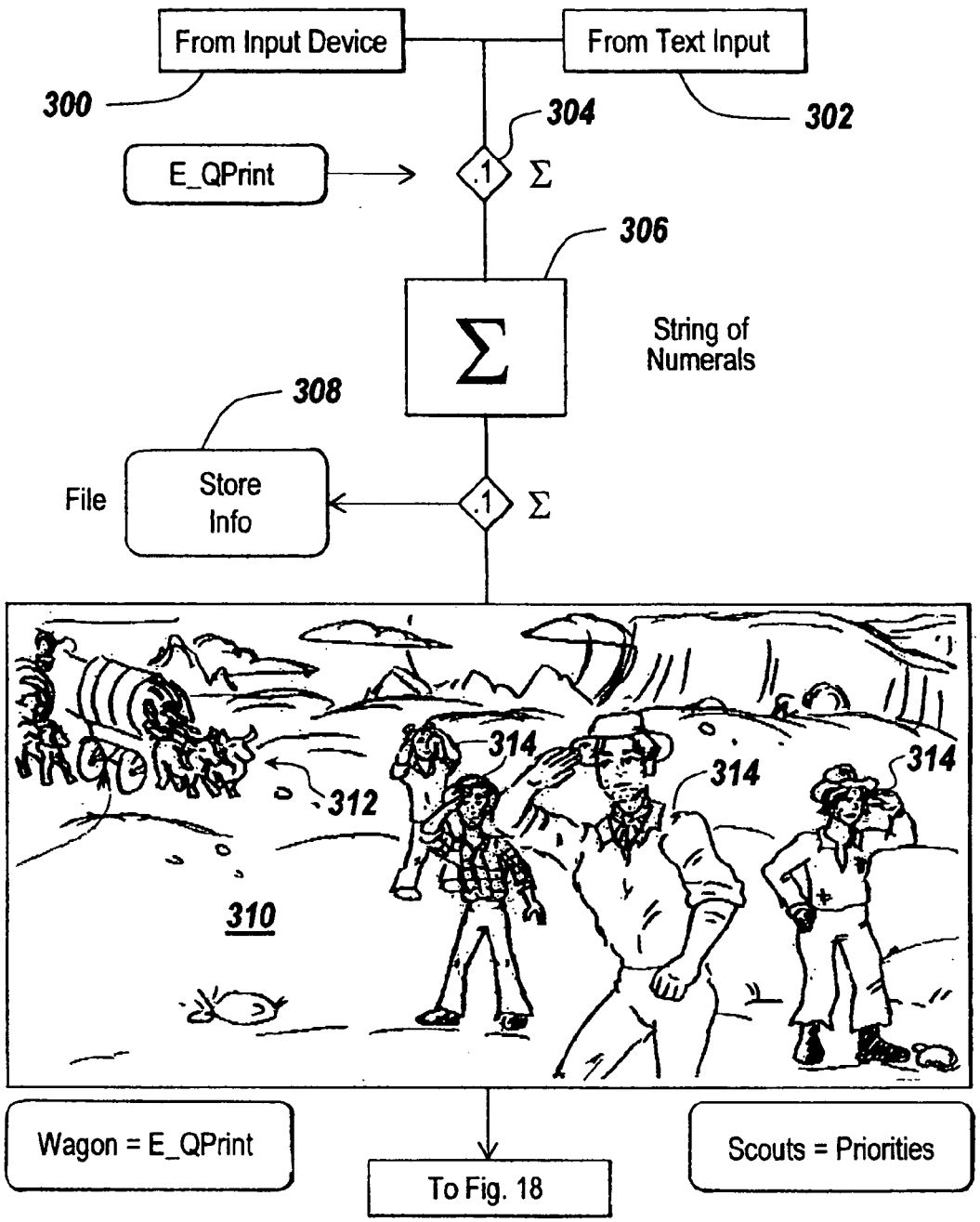
FIG. 17 is a diagrammatic illustration of a search initiation from a vision parameter input device or a text input device, showing the ability of the system to search the library of FIG. 1 for matching fingerprints which are the sum of all of the parameters, whether generated by vision parameters or text input; and, FIG. 18 is a flowchart showing the transmission of a fingerprint to the net from whence it goes to a server which performs the matching operation, the results of which are transmitted back after the matching operation through either e-mails, regular mail, or telephonic communication, from which query results can be provided to the individual.

Referring to FIG. 17, whether the input is from an input device such as described as illustrated at 300 or from a text input as illustrated at 302, the fingerprint is the sum of all of the entries as illustrated at 304 such that a string of numbers is provided as a sum of 306, whereupon this string may be stored at 308 or utilized as illustrated diagrammatically in a fuzzy-logic search process as illustrated by graphic 310. Here the scouts are looking through the library of FIG. 1 for fingerprint matches whereas, in this case, the wagon 312 is indicative of the fingerprint, whereas scouts 314 are there to indicate priorities which are set during the search matching process.

Figure 18:
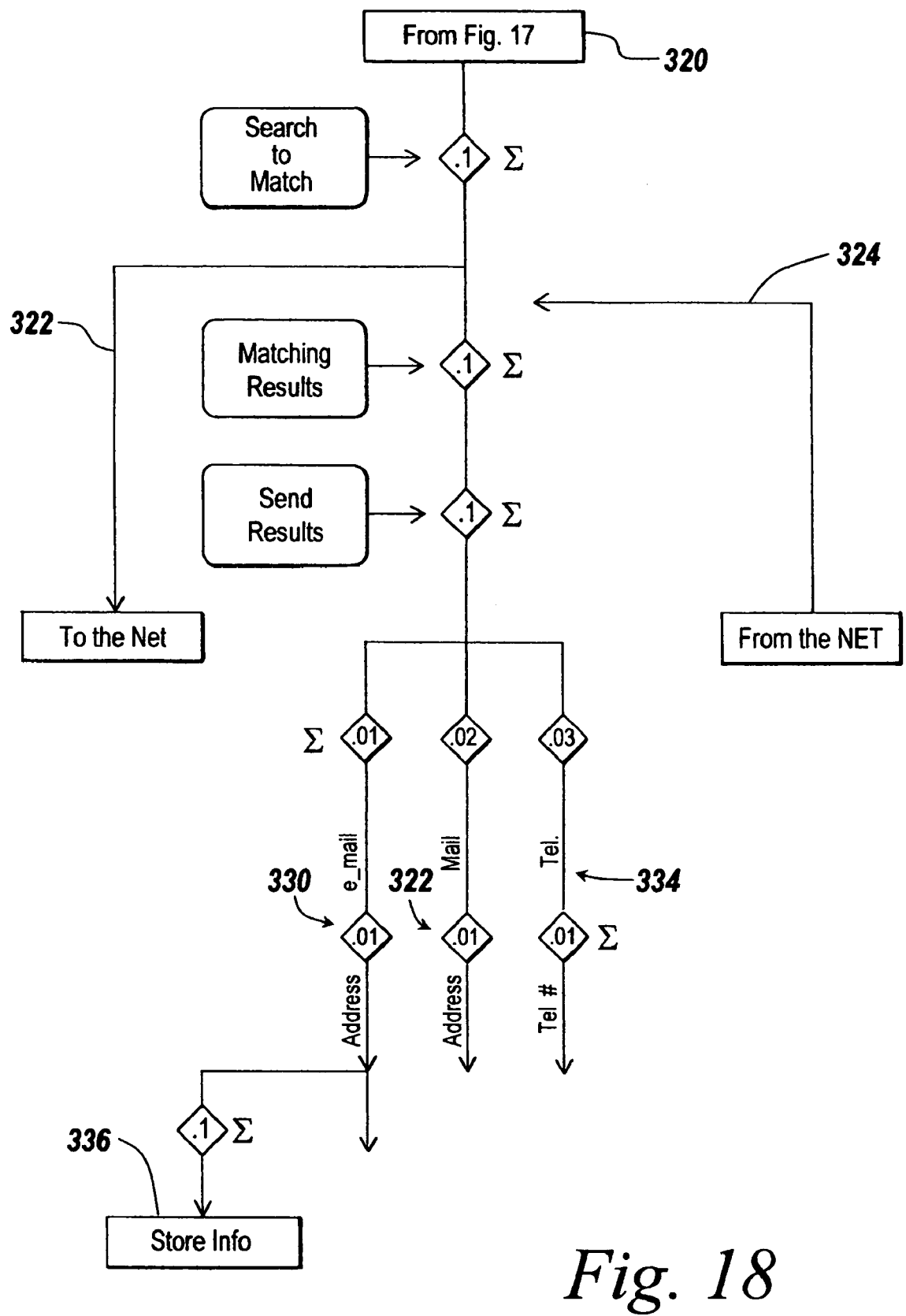

Referring now to FIG. 18, once one has developed a fingerprint such as illustrated at 320, the sum total of all of the parameters and priorities that make the fingerprint are sent via the internet 322 to initiate a search. The results of the search are sent via the internet at 324 to the library of FIG. 1 to provide matching results 326, which are in turn sent at 328, either in terms of, for instance, email addresses 330, as physically mailed as illustrated at 332, or the information is telephoned to a particular telephone number as illustrated at 334. If the information is in the form of an emailed website, then this information is stored at the recipient's site at 336.

What is now presented is an example of generating a fingerprint using the selection of hypothetical vision parameters. Note that the asterisked hypothetical vision parameters are the selected hypothetical vision parameters.

Positions & Sub Positions
Of the Flow Diagram of universal way to shop

| Position # | | Numbers | Description |
|---|---|---|---|
| 1st | .0 | | No information |
| | .1* | | Information about selecting the way |
| | | .01* | Audio visual non textual |
| | | .02 | Audio textual selection |
| | | .03 | Audio others "keyword" etc |
| 2nd | Σ.0 | | No information |
| | Σ.1* | | Information about Which part of universe |
| | | .01 | Sea |
| | | .02* | Land |
| | | .03 | Space |
| 3rd | Σ.0* | | No information |
| | Σ.1 | | Information about encountering hypothetical objects in clouds |
| 4th | Σ.0* | | No information |
| | Σ.1 | | Information about Selection of object seen in position # 3 |
| | | .01 | Clouds |
| | | .02 | Airplanes |
| | | .03 | Birds |
| | | .04 | Gliders |
| | | .05 | Balloons |
| | | .06 | Parachutes |
| | | .07 | Hand glider |
| | | .08 | Air force |
| | | .09 | Rockets |
| | | .0n | Others |
| 5th | Σ.0 | | No information |
| | Σ.1* | | Information about which position of land |
| | | .01* | North America |
| | | .02 | Central America |
| | | .03 | South America Europe |
| | | .04 | Europe |
| | | .05 | Africa |
| | | .06 | Middle East |
| | | .07 | Asia |
| | | .08 | Australia |

-continued

Positions & Sub Positions
Of the Flow Diagram of universal way to shop

| Position # | Numbers | | Description |
|---|---|---|---|
| | | .09 | North Pole |
| | | .010 | South Pole |
| $6^{th}$ | Σ .0 | | No information |
| | Σ .1* | | Information about which zooming (+), (−) and dragging of land |
| | | .01* | Slide 1 |
| | | .02 | Slide 2 |
| | | .03 | Slide 3 |
| | | .04 | Slide 4 |
| | | .05 | Slide 5 |
| | | .06 | Slide 6 |
| $7^{th}$ | Σ .0 | | No information |
| | Σ .1* | | Information about continue zooming to land after clouds |
| $8^{th}$ | Σ .0 | | No information |
| | Σ .1* | | Information about hypothetical cities/towns |
| | | .01* | Home |
| | | .0n | Others |
| $9^{th}$ | Σ .0 | | No information |
| | Σ .1* | | Information about selecting hypothetical city any city/town |
| $10^{th}$ | Σ .0 | | No information |
| | Σ .1* | | Information about selected item |
| | | .01* | Building |
| | | .02 | People |
| | | .03 | Cars |
| | | .04 | Airplanes |
| | | .05 | Ships |
| | | .06 | Zoo |
| | | .07 | School |
| | | .08 | Nature |
| | | .0n | Others |
| $11^{th}$ | Σ .0* | | No information |
| | Σ .1 | | Information about which zooming (+) (−) and dragging to sea |
| | | .01 | Slide 1 |
| | | .02 | Slide 2 |
| | | .03 | Slide 3 |
| | | .04 | Slide 4 |
| $12^{th}$ | Σ .0* | | No information |
| | Σ .1 | | Information about continue zooming to sea after clouds |
| $13^{th}$ | Σ .0* | | No information |
| | Σ .1 | | Information about objects in the sea |
| $14^{th}$ | Σ .0* | | No information |
| | Σ .1 | | Information about selecting from position # 13 |
| | | .01 | Cruiser ship |
| | | .02 | Boat |
| | | .03 | Fish |
| | | .04 | Navy |
| | | .05 | Jet skies |
| | | .06 | Tankers |
| | | .07 | Divers |
| | | .08 | Oil rings |
| | | .0n | Others |
| $15^{th}$ | Σ .0* | | No information |
| | Σ .1 | | Information about zooming (+) (−) dragging in space |
| | | .01 | Slide 1 |
| | | .02 | Slide 2 |
| | | .03 | Slide 3 |
| $16^{th}$ | Σ .0* | | No information |
| | Σ .1 | | Information about |

-continued

Positions & Sub Positions
Of the Flow Diagram of universal way to shop

| Position # | Numbers | | | Description |
|---|---|---|---|---|
| | | | | encounter objects as you zoom in space |
| 17th | Σ .0* | | | No information |
| | Σ .1 | | | Information about objects in space |
| 18th | Σ .0* | | | No information |
| | Σ .1 | | | Information about selecting from position # 17 |
| | | .01 | | Satellite |
| | | .02 | | Space craft |
| | | .03 | | Rockets |
| | | .04 | | Planets |
| | | .0n | | Others |
| 19th | Σ .0 | | | No information |
| | Σ .1* | | | Information about display selected item and similar items |
| 20th | Σ .0 | | | No information |
| | Σ .1* | | | Information about final selection of item/similar |
| | | .01* | | Office building |
| | | .02 | | Houses |
| | | .03 | | Hospitals |
| | | .04 | | Schools |
| | | .05 | | Hotels |
| | | .06 | | Airports |
| | | .07 | | Public building |
| | | .0n | | Others |
| 21st | Σ .0 | | | No information |
| | Σ .1* | | | Information about sub category of position # 20 |
| | | .01* | | High rise |
| | | .02 | | Garden office |
| | | .03 | | Mixed function |
| | | .04 | | One story |
| | | .0n | | Others |
| 22nd | Σ .0 | | | No information |
| | Σ .1* | | | Information about type of enquiry |
| | | .01* | | Inside of the item |
| | | .02 | | Outside of the item |
| | | .03 | | General information of the item |
| 23rd | Σ .0 | | | No information |
| | Σ .1* | | | Information about hypothetical interiors of the selected item |
| | | .01* | | Slide 1 |
| | | .02 | | Slide 2 |
| | | .03 | | Slide 3 |
| | | .04 | | Slide 4 |
| 24th | Σ .0 | | | No information |
| | Σ .1* | | | Information about display selected category and similar categories |
| 25th | Σ .0 | | | No information |
| | Σ .1* | | | Information about final selection of category |
| | | .01* | | Office chair |
| | | .02 | | Dinning chair |
| | | .03 | | Relax chair |
| | | .04 | | Comfort chair |
| | | .05 | | Banquet chair |
| | | .06 | | Outdoor chair |
| | | .0n | | Others chair |
| 26th | Σ .0* | | | No information |
| | Σ .1 | | | Information about selecting general categories from library |
| | | .01 | | |
| | | .0n | | |
| | | | .001 | |
| | | | .00n | |

-continued

Positions & Sub Positions
Of the Flow Diagram of universal way to shop

| Position # | Numbers | | | | Description |
|---|---|---|---|---|---|
| | | | | .0001 | |
| | | | | .000n | |
| 27th | Σ .0* | | | | No information |
| | Σ .1 | | | | Information about final category |
| 28th | Σ .0 | | | | No information |
| | Σ .1 | | | | Information about typing the category |
| 29th | Σ .0 | | | | No information |
| | Σ .1* | | | | Information about location of user |
| | | .01* | | | Home Boston |
| | | | .001* | | Password |
| | | .02 | | | Others |
| | | | .002 | | Pin number |
| 30th | Σ .0 | | | | No information |
| | Σ .1* | | | | Information about search zone and location |
| | | .01* | | | Home Boston |
| | | .02 | | | Others |
| 31st | Σ .0 | | | | No information |
| | Σ .1* | | | | Information about virtual consultant |
| | | .01* | | | Continue |
| | | | .001 | | Refresh |
| | | | .002* | | Continue |
| | | | | .0001* | Default |
| | | | | .0002 | Standby |
| | | | | .0003 | Consumer subjects |
| | | | | .0004 | No |
| | | .02 | | | Skip |
| 32nd | Σ .0 | | | | No information |
| | Σ .1* | | | | Information about choosing consultant |
| | | .01 | | | Refresh |
| | | .02* | | | Continue |
| | | | .001* | | Consultant # 1 |
| | | | .002 | | Consultant # 2 |
| | | | .003 | | Consultant # 3 |
| | | | .004 | | Consultant # 4 |
| | | | .00n | | Consultant # n |
| 33rd | Σ .0 | | | | No information |
| | Σ .1* | | | | Information about demonstration |
| | | .01 | | | Refresh |
| | | .02* | | | Continue |
| 34th | Σ .0 | | | | No information |
| | Σ .1* | | | | Information about status for virtual consultant |
| | | .01* | | | Save |
| | | .02 | | | Temporary saving |
| | | .03 | | | Exit |
| 35th | Σ .0 | | | | No information |
| | Σ .1* | | | | Information about demonstration to create E-QPrint |
| | | .01* | | | Audio visual non textual |
| | | .02 | | | Audio textual selection |
| | | .03 | | | Audio others "Keyword" etc |
| 36th | Σ .0 | | | | No information |
| | Σ .1* | | | | Information about control board |
| | | .01* | | | Start |
| | | .02* | | | Stop |
| | | .03* | | | Pause |
| | | .04* | | | Forward |
| | | .05* | | | Rewind |
| 37th | Σ .0 | | | | No information |
| | Σ .1* | | | | Information about parameters |
| | | .01* | | | Description |
| | | | .001* | | Status |
| | | | | .0001 | Monolit |

Positions & Sub Positions
Of the Flow Diagram of universal way to shop

| Position # | Numbers | | | | | | | Description |
|---|---|---|---|---|---|---|---|---|
| | | | | .0002* | | | | Composite |
| | | | .002 | | | | | View & 3D |
| | | | .003* | | | | | Physical properties |
| | | | | .0001 | | | | All upholstered |
| | | | | .0002* | | | | Partly upholstered |
| | | | | .0003 | | | | Not upholstered |
| | | | .004* | | | | | Components |
| | | | | .0001* | | | | Arm |
| | | | | | .00001* | | | Metal |
| | | | | | | .000001* | | Chrome polish |
| | | | | | | .00000n | | |
| | | | | .0002* | | | | Back |
| | | | | | .00001* | | | Upholstered border |
| | | | | | | .000001* | | Leather |
| | | | | | | .00000n | | |
| | | | | .0003* | | | | Seat |
| | | | | | .00001* | | | Upholstered |
| | | | | | | .000001* | | Leather |
| | | | | | | .00000n | | |
| | | | | .0004* | | | | Support |
| | | | | | .00001* | | | Pedestal metal |
| | | | | | | .000001* | | Chrome mat |
| | | | | | | .00000n | | |
| | | | | | | | .0000001* | Plummatic |
| | | | .005 | | | | | Feed back by provider |
| | | | .006 | | | | | Other properties |
| | | .02 | | | | | | Location |
| | | .03* | | | | | | Price |
| | | | .001 | | | | | $0-100 |
| | | | .002* | | | | | $100-150 |
| | | .04 | | | | | | Consultant |
| | | .05* | | | | | | Payment |
| | | | .001 | | | | | 1 payment |
| | | | .002* | | | | | 2 payments |
| | | .06* | | | | | | Shipment |
| | | | .001* | | | | | 1 week |
| | | | .002 | | | | | 2 weeks |
| | | | .003 | | | | | 3 weeks |
| | | .07* | | | | | | Insurance/Warranty |
| | | | .001* | | | | | 1 year |
| | | | .002 | | | | | 2 years |
| | | .08 | | | | | | Maintenance |
| | | .0n | | | | | | Others |
| 38th | Σ .0 | | | | | | | No information |
| | Σ .1* | | | | | | | Information about universal master plan |
| | | .01* | | | | | | Master plan of selected category |
| | | .0n | | | | | | Others |
| 39th | Σ .0 | | | | | | | No information |
| | Σ .1* | | | | | | | Information about creation of fingerprint E-QPrint from parameters |
| 40th | Σ .0 | | | | | | | No information |
| | Σ .1* | | | | | | | Information about creation of fingerprint E-QPrint from priorities |
| | | .01* | | | | | | Description |
| | | | .001 | | | | | No priority |
| | | | .002* | | | | | 1st priority |
| | | | .003* | | | | | 2nd priority |
| | | | .00n | | | | | nth priority |
| | | .02* | | | | | | Location |
| | | | .001* | | | | | No priority |
| | | | .002 | | | | | 1st priority |
| | | | .003 | | | | | 2nd priority |
| | | | .00n | | | | | nth priority |
| | | .03* | | | | | | Price |
| | | | .001 | | | | | No priority |
| | | | .002 | | | | | 1st priority |
| | | | .003 | | | | | 2nd priority |
| | | | .004* | | | | | 3rd priority ($100-150) |
| | | | .00n | | | | | nth priority |
| | | .04* | | | | | | Consultant |

-continued

Positions & Sub Positions
Of the Flow Diagram of universal way to shop

| Position # | Numbers | | | Description |
|---|---|---|---|---|
| | | | .001* | No priority |
| | | | .002 | 1st priority |
| | | | .003 | 2nd priority |
| | | | .00n | nth priority |
| | | .05* | | Payment |
| | | | .001 | No priority |
| | | | .002 | 1st priority |
| | | | .003* | 2nd priority (2 installments) |
| | | | .00n | nth priority |
| | | .06* | | Shipment |
| | | | .001* | No priority |
| | | | .002 | 1st priority |
| | | | .003 | 2nd priority |
| | | | .00n | nth priority |
| | | .07* | | Insurance/Warranty |
| | | | .001 | No priority |
| | | | .002 | 1st priority |
| | | | .003* | 2nd priority (1 year) |
| | | | .00n | nth priority |
| | | .08* | | Maintenance |
| | | | .001* | No priority |
| | | | .002 | 1st priority |
| | | | .003 | 2nd priority |
| | | | .00n | nth priority |
| | | .0n | | Others |
| | | | .001 | No priority |
| | | | .002 | 1st priority |
| | | | .003 | 2nd priority |
| | | | .00n | nth priority |
| 41st | $\Sigma$ .0 | | | No information |
| | $\Sigma$ .1* | | | Information about creating your E_QPrint parameters and priorities |
| 42nd | $\Sigma$ .0* | | | No information |
| | $\Sigma$ .1 | | | Information about input format by textual selection for parameters and priorities |
| 43rd | $\Sigma$ .0* | | | No information |
| | $\Sigma$ .1 | | | Information about creation of E-QPrint by parameters and priorities from textual selection |
| 44th | $\Sigma$ .0 | | | No information |
| | $\Sigma$ .1* | | | Information about string of numbers |
| 45th | $\Sigma$ .0 | | | No information |
| | $\Sigma$ .1* | | | Information about storing information E-QPrint |
| 46th | $\Sigma$ .0 | | | No information |
| | $\Sigma$ .1* | | | Information about search to match |
| 47th | $\Sigma$ .0 | | | No information |
| | $\Sigma$ .1* | | | Information about matching results |
| 48th | $\Sigma$ .0 | | | No information |
| | $\Sigma$ .1* | | | Information about sending results |
| | | .01* | | e-mail |
| | | | .001* | Address |
| | | .02* | | Mail |
| | | | .001* | Address |
| | | .03* | | Telephone |
| | | | .001* | Telephone # |

*Reference # of example office chair

The following is an example of a targeted search for a chrome chair:

Office chair with chrome polish arm, upholstered back with leather and border, seat leather black and plummatic pedestal support chrome matt.

Price between $100 and $150, payment in 2 installments with one-year guarantee and delivery in one week.

0.1.01.1.02.0.0.1.01.1.01.1.1.01.1.1.01.0.0.0.0.0.0.0.0.
1.1.01.1.01.1. 01.1.01.1.1.01.0.0.0.1.01.001.1.01.1.01.002.
0001.1.02.001.1.02.1. 01.1.01.1.01.02.03.04.05.1.01.001.

0002.003.0002.004.0001.00001. 000001.0002.00001.000 001.0003.00001.000001.0004.00001. 000001.0000001.03. 002.05.002.06.001.07.001.1.01.1.1.01.001.002. 02.001.03. 004.04.001.05.003.06.001.07.003.08.001.1.0.0.1.1.1.1.0 1.001.02.001.03.001.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a targeted search system in which a fingerprint is generated corresponding to the targeted search, a method of inputting target search fingerprint parameters, comprising the steps of:
   providing a database constructed to support the generation of a fingerprint, the database having graphics corresponding to hypothetical vision parameters organized in accordance with the associated database construction involving a master plan and parameters;
   generating a number of hypothetical vision parameters from the database; and,
   selecting which vision parameters are to be used in the fingerprint.

2. The method of claim 1, wherein the selected hypothetical vision parameters are cascaded in accordance with the selection.

3. The method of claim 2, wherein each of the hypothetical vision parameters has an associated number, and further including the step of combining the numbers associated with the selected hypothetical vision parameters to form the fingerprint.

4. The method of claim 1, wherein the selection step includes providing the hypothetical vision parameters on a touch screen, the selection of a hypothetical vision parameter being accomplished by touching the portion of the touch screen at which the hypothetical vision parameter to be selected is situated.

5. The method of claim 4, and further including the step of maintaining selected hypothetical vision parameters in one region of the touch screen.

6. The method of claim 5, and further including the step of permitting return to a preselected hypothetical vision parameter by touching a hypothetical vision parameter maintained on the touch screen.

7. The method of claim 6, wherein hypothetical vision parameters maintained on the touch screen are cascaded in the original selection order.

8. The method of claim 7, wherein selection of a hypothetical vision parameter maintained on the touch screen permits going to a predetermined place in the cascade.

9. The method of claim 1, and further including a virtual consultant hypothetical vision parameter and further including the step of exiting the virtual consultant by selecting the hypothetical vision parameter corresponding to the virtual consultant.

10. The method of claim 1, wherein a hypothetical vision parameter includes therein a number of hypothetical vision parameters, and further including the step of zooming in on one of the number of hypothetical vision parameters to display the zoomed-to hypothetical vision parameter.

11. The method of claim 10, wherein a hypothetical vision parameter defines a category having a number of hypothetical vision parameters and by zooming thereon a number of the hypothetical vision parameters in the category are presented.

12. The method of claim 1, and further including the step of an entrant generating its particular fingerprint to which the targeted fingerprint is to be matched by generating the entrant's own hypothetical vision parameter.

13. The method of claim 12, wherein the entrant's hypothetical vision parameters include the step of presenting the entrant's hypothetical vision parameter on a touch screen.

14. The method of claim 1, and further including the step of generating audio-based hypothetical parameters.

15. The method of claim 14, wherein the audio-based hypothetical parameters are generated in place of hypothetical vision parameters.

16. A textless system for implementing input to a fingerprint-based targeted search system, comprising:
   a database constructed to support the generation of a fingerprint, the database having graphics corresponding to hypothetical vision parameters organized in accordance with the associated database construction involving a master plan and parameters;
   a touch screen for displaying a hypothetical vision parameter from the vision parameters organized in said database; and
   a fingerprint generator for generating a fingerprint based on sequential touch screen selected hypothetical vision parameters, whereby the system can be used by those not familiar with any given language.

* * * * *